US008635502B2

United States Patent
Shu

(10) Patent No.: US 8,635,502 B2
(45) Date of Patent: Jan. 21, 2014

(54) DEBUG CARD AND METHOD FOR DIAGNOSING FAULTS

(75) Inventor: Teng-Yuan Shu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/227,608

(22) Filed: Sep. 8, 2011

(65) Prior Publication Data

US 2012/0226941 A1    Sep. 6, 2012

(30) Foreign Application Priority Data

Mar. 2, 2011    (TW) .................................. 100106998

(51) Int. Cl.
*G06F 11/00*    (2006.01)
(52) U.S. Cl.
USPC .......................................................... 714/57
(58) Field of Classification Search
USPC .......................................................... 714/57
See application file for complete search history.

(56) References Cited

U.S. PATENT DOCUMENTS

| 3,746,845 A | * | 7/1973 | Henegar et al. | ............... | 700/189 |
| 2007/0174705 A1 | * | 7/2007 | Shih | ................................ | 714/36 |
| 2010/0141462 A1 | * | 6/2010 | Qiu et al. | ...................... | 340/653 |
| 2011/0213564 A1 | * | 9/2011 | Henke | ............................. | 702/23 |

* cited by examiner

*Primary Examiner* — Michael Maskulinski
*Assistant Examiner* — Neil Miles
(74) *Attorney, Agent, or Firm* — Altis Law Group, Inc.

(57) ABSTRACT

A debug card for diagnosing a motherboard and a power supply unit (PSU) of a same computer includes a plurality of first nixie tubes, a plurality of second nixie tubes, a first port, a second port, and a control unit. The control unit is electronically connected to the plurality of first nixie tubes, the plurality of second nixie tubes, the first port, and the second port. The first port is electronically connected to the motherboard, and the second port is electronically connected to the PSU. Under the control of the control unit, fault codes of the motherboard are displayed by the plurality of the first nixie tubes, and fault codes of the PSU are displayed by the plurality of the second nixie tubes.

7 Claims, 2 Drawing Sheets

DEBUG CARD AND METHOD FOR DIAGNOSING FAULTS

BACKGROUND

1. Technical Field

The present disclosure relates to debug cards and method for diagnosing faults, and particularly to a debug card and method for diagnosing faults of a motherboard and a power supply unit.

2. Description of Related Art

Power on self test (POST) refers to routines that are immediately run after power is applied to an electronic device. During POST of a computer, a basic input output system (BIOS) of the computer sends POST codes to port 80 of an industrial standard architecture (ISA) bus. When a test item starts, a POST code is sent to the port 80; if the test item successfully completes, next POST code is sent to the port 80.

A debug card is a very useful tool for diagnosing faults of motherboard of the computer. The debug card is electronically connected to peripheral component interconnect (PCI) bus or ISA bus on the motherboard. Then the debug card receives POST codes via the bus, and the POST codes are successively displayed by a plurality of nixie tubes of the debug card. When the motherboard is faulted, the POST codes displayed by the plurality of nixie tubes cease to change. According to unchanged POST code displayed by the plurality of nixie tubes, technicians analyze specific fault reasons.

However, power supply unit (PSU) of the computer and the motherboard are relatively independent units. If faults of the PSU cause a fault of the motherboard, for example, the motherboard has no failure itself and the PSU malfunctioned, the unchanged POST code displayed by the plurality of nixie tubes will lead to a wrong diagnosis. Therefore, sometimes it is difficult for the technicians to use the debug card to analyze specific fault reasons accurately.

Therefore, there is a room for improvement within the art.

BRIEF DESCRIPTION OF THE DRAWINGS

Many aspects of the present debug card and method for diagnosing faults can be better understood with reference to the following drawings. The components in the various drawings are not necessarily drawn to scale, the emphasis instead being placed upon clearly illustrating the principles of the present debug card and method for diagnosing faults.

DETAILED DESCRIPTION

Figure 1:
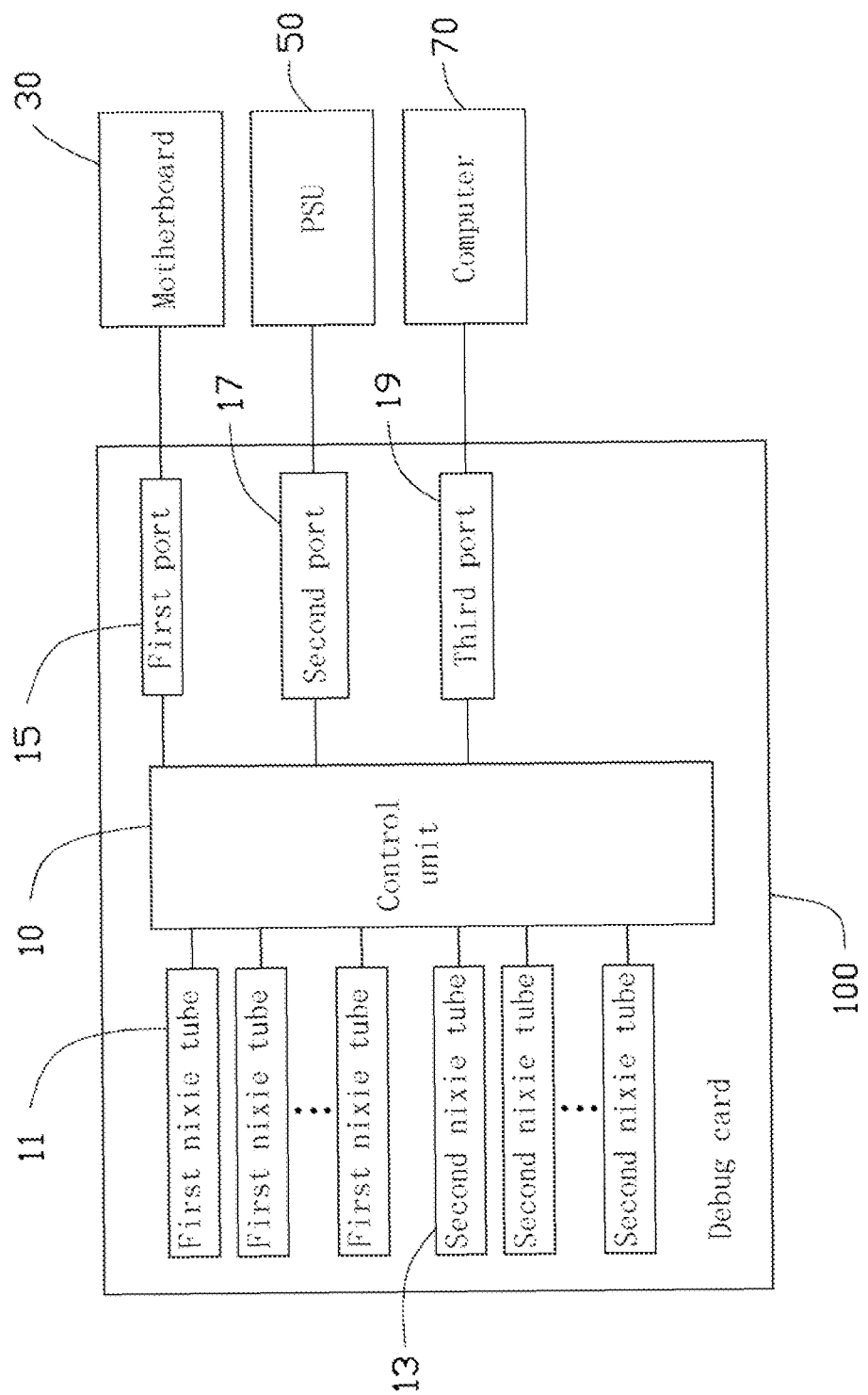
FIG. 1 is a block diagram of a debug card, a motherboard, a PSU, and a computer according to one embodiment of the present disclosure.

Referring to FIG. 1, a debug card 100 for diagnosing faults of a motherboard 30 and a PSU 50 of a same computer is shown. The debug card 100 includes a control unit 10, a plurality of first nixie tubes 11, a plurality of second nixie tubes 13, a first port 15, a second port 17, and a third port 19. The plurality of the first nixie tubes 11, the plurality of the second nixie tubes 13, the first port 15, the second port 17, and the third port 19 are electronically connected to the control unit 10.

The first port 15 is electronically connected to the motherboard 30. The second port 17 is electronically connected to the PSU 50. The third port 19 is electronically connected to a computer 70 used for testing. POST codes of the motherboard 30 are displayed by the plurality of the first nixie tubes 11, and feedback codes of the PSU 50 are displayed by the plurality of the second nixie tubes 13. The feedback codes of the PSU 50 provided by manufacturers are similar to the POST codes of the motherboard 30 and are prestored in the control unit 10. Both the POST codes and the feedback codes can be referred as fault codes.

Figure 2:
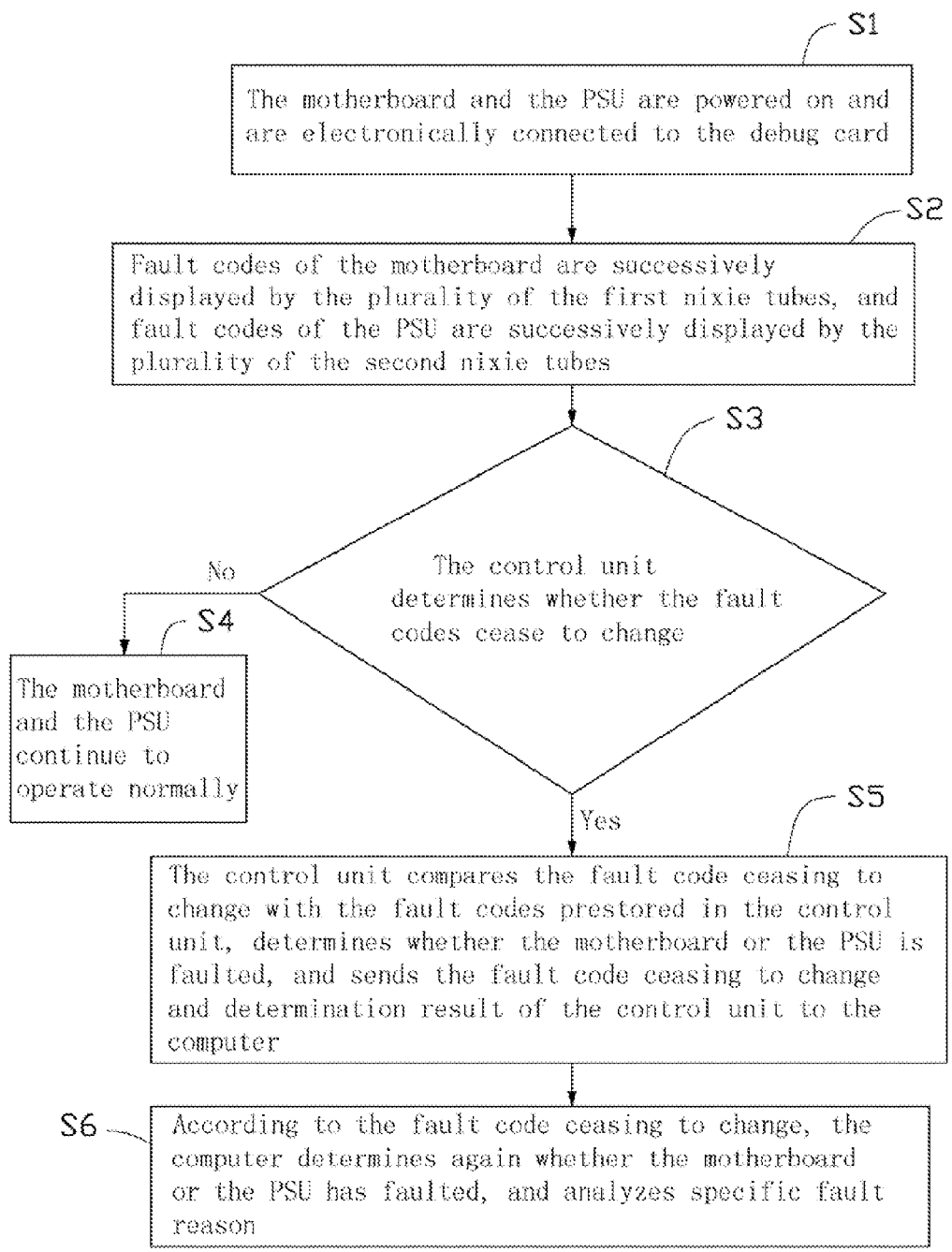
FIG. 2 is a flowchart illustrating method for diagnosing faults using the debug card shown in FIG. 1.

Referring to FIG. 2, a method for diagnosing faults of the motherboard 30 and the PSU 50 using the debug card 100 is as follows:

In step S1, the motherboard 30 and the PSU 50 are powered on and are electronically connected to the debug card 100. The motherboard 30 and the PSU 50 communicate with the debug card 100.

In step S2, under the control of the control unit 10, the fault codes of the motherboard 30 are successively displayed by the plurality of the first nixie tubes 11, and the fault codes of the PSU 50 are successively displayed by the plurality of the second nixie tubes 13.

In step S3, the control unit 10 determines whether the fault codes displayed by the plurality of the first nixie tubes 11 or the plurality of the second nixie tubes 13 cease to change. If the fault codes displayed by the plurality of the first nixie tubes 11 or the plurality of the second nixie tubes 13 are successively changed, step S4 is implemented. If the fault codes displayed by the plurality of the first Nixie tubes 11 or the plurality of the second Nixie tubes 13 cease to change, step S5 is implemented.

In step S4, the motherboard 30 and the PSU 50 continue to operate normally.

In step S5, the control unit 10 compares the fault code ceasing to change with the fault codes prestored in the control unit 10. According to comparison result, the control unit 10 determines whether the motherboard 30 or the PSU 50 is faulted, that is the motherboard 30 or the PSU 50 malfunctioned. The fault code ceasing to change and determination result of the control unit are sent to the computer 70.

In step S6, according to the fault code ceasing to change, the computer 70 determines again whether the motherboard 30 or the PSU 50 has faulted, and analyzes specific fault reason.

As detailed above, the debug card 100 can simultaneously diagnose faults of the motherboard 30 and the PSU 50. The debug card 100 is convenient to use and saves diagnosis time.

In another exemplary embodiment, the third port 19 and the computer 70 can be omitted. Technicians can analyze specific fault reasons according to the fault code that ceases to change.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A debug card for diagnosing faults of a motherboard and a power supply unit (PSU) of a same computer, the debug card comprising:
   a plurality of first nixie tubes;
   a plurality of second nixie tubes;
   a first port electronically connected to the motherboard;
   a second port electronically connected to the PSU; and a control unit electronically connected to the plurality of first nixie tubes, the plurality of second nixie tubes, the first port, and the second port;

wherein under the control of the control unit, fault codes of the motherboard are displayed by the plurality of the first nixie tubes during a power on self test (POST) of the computer, and fault codes of the PSU are displayed by the plurality of the second nixie tubes during the POST.

2. The debug card as claimed in claim 1, wherein the fault codes of the PSU are prestored in the control unit.

3. The debug card as claimed in claim 2, wherein the control unit determines whether the fault codes displayed by the plurality of the first nixie tubes or the plurality of the second nixie tubes cease to change, compares fault code ceasing to change with the fault codes prestored in the control unit, and determines whether the motherboard or the PSU is faulted according to comparison result.

4. The debug card as claimed in claim 3, further comprising a third port electronically connected to a computer used for testing.

5. The debug card as claimed in claim 4, wherein the fault code ceasing to change and determination result of the control unit are sent to the computer used for testing, the computer used for testing determines again whether the motherboard or the PSU has faulted, and analyzes fault reason according to the fault code ceasing to change.

6. A method for diagnosing faults of a motherboard and a power supply unit (PSU) of a same computer, the method comprising:

providing a debug card comprising a plurality of first nixie tubes; a plurality of second nixie tubes; a first port electronically connected to the motherboard; a second port electronically connected to the PSU; and a control unit electronically connected to the plurality of first nixie tubes, the plurality of second nixie tubes, the first port, and the second port;

successively displaying fault codes of the motherboard by the plurality of the first nixie tubes and successively displaying fault codes of the PSU by the plurality of the second nixie tubes during a power on self test (POST) of the computer;

determining whether the fault codes displayed by the plurality of the first nixie tubes or the plurality of the second nixie tubes cease to change during the POST, if the fault codes displayed by the plurality of the first nixie tubes or the plurality of the second nixie tubes are successively changed, the motherboard and the PSU continue to operate normally; if the fault codes displayed by the plurality of the first nixie tubes or the plurality of the second nixie tubes cease to change, the control unit compares the fault code ceasing to change with the fault codes prestored in the control unit and determines whether the motherboard or the PSU is faulted.

7. The method as claimed in claim 6, wherein the fault code ceasing to change and determination result of the control unit are sent to a computer used for testing to determine again whether the motherboard or the PSU has faulted, and analyzes fault reason.

* * * * *